(12) United States Patent
Depping et al.

(10) Patent No.: US 8,766,762 B2
(45) Date of Patent: Jul. 1, 2014

(54) OVERVOLTAGE PROTECTION ELEMENT

(75) Inventors: Christian Depping, Lemgo (DE); Christina Grewe, Detmold (DE); Joachim Wosgien, Loehne (DE); Philip Jungermann, Blomberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 13/642,697

(22) PCT Filed: Apr. 15, 2011

(86) PCT No.: PCT/EP2011/001916
§ 371 (c)(1),
(2), (4) Date: Jan. 2, 2013

(87) PCT Pub. No.: WO2011/141115
PCT Pub. Date: Nov. 17, 2011

(65) Prior Publication Data
US 2013/0106567 A1 May 2, 2013

(30) Foreign Application Priority Data

Apr. 20, 2010 (DE) .......................... 10 2010 015 814

(51) Int. Cl.
*H01C 1/02* (2006.01)
*H01C 7/12* (2006.01)
*H02H 9/04* (2006.01)

(52) U.S. Cl.
CPC .. *H01C 7/12* (2013.01); *H01C 1/02* (2013.01); *H02H 9/04* (2013.01); *H02H 9/041* (2013.01)
USPC ................. 338/260; 338/20; 338/13

(58) Field of Classification Search
CPC .............. H01C 1/02; H01C 7/12; H02H 9/04; H02H 9/041
USPC ....................... 338/260, 20, 13; 361/127, 117
See application file for complete search history.

(56) References Cited

U.S. PATENT DOCUMENTS

| 4,305,109 A | 12/1981 | Schilling et al. |
| 4,907,119 A * | 3/1990 | Allina ............................. 361/56 |

(Continued)

FOREIGN PATENT DOCUMENTS

| DE | 695 03 743 T2 | 3/1999 |
| DE | 601 12 410 T2 | 5/2006 |

(Continued)

*Primary Examiner* — Kyung Lee
(74) *Attorney, Agent, or Firm* — Roberts Mlotkowski Safran & Cole, P.C.; David S. Safran

(57) ABSTRACT

An overvoltage protection element is disclosed that includes a housing, connections for electrically connecting the overvoltage protection element to a current path or a signal path to be protected The overvoltage protection element further includes two varistors arranged inside the housing and electrically connected in parallel, and a center electrode arranged at least partially between the varistors. The housing has two housing halves made of metal and electrically connected to each other, wherein the center electrode is isolated from the housing halves and is electrically connected at the opposite sides of the electrode to a first connection area of a varistor and wherein the two varistors and the center electrode are sandwiched between the two housing halves. One housing half is designed as a cover, which has a covering section and a recessed engagement section. In the installed states of the two housing halves, the engagement section engages in the corresponding receiving space formed by the other housing half and the covering section covers the receiving space, and in that the two housing halves are connected to each other such that in the installed state a visible gap is present between the two housing halves.

8 Claims, 7 Drawing Sheets

(56) References Cited

U.S. PATENT DOCUMENTS

| | | | |
|---|---|---|---|
| 5,181,000 A * | 1/1993 | Smith | 333/181 |
| 5,721,664 A | 2/1998 | Uken et al. | |
| 5,808,850 A * | 9/1998 | Carpenter, Jr. | 361/127 |
| 5,936,824 A * | 8/1999 | Carpenter, Jr. | 361/126 |
| 7,477,503 B2 * | 1/2009 | Aszmus | 361/124 |
| 7,684,166 B2 * | 3/2010 | Donati et al. | 361/118 |
| 8,089,745 B2 | 1/2012 | Wosgien | |
| 8,378,778 B2 * | 2/2013 | Duval et al. | 338/20 |
| 2005/0231872 A1 * | 10/2005 | Schimanski et al. | 361/91.1 |
| 2009/0009921 A1 * | 1/2009 | Wosgien | 361/127 |

FOREIGN PATENT DOCUMENTS

| | | |
|---|---|---|
| DE | 10 2007 030 653 A1 | 2/2009 |
| DE | 10 2008 013 447 A1 | 9/2009 |

* cited by examiner

OVERVOLTAGE PROTECTION ELEMENT

BACKGROUND OF THE INVENTION

1. Field of the Invention

The invention relates to an overvoltage protection element with a housing, terminals for electrical connection of the overvoltage protection element to a current path or a signal path to be protected, two varistors which are connected electrically in parallel and which are located within the housing, and a middle electrode located at least partially between the varistors. The housing has two metal housing halves which are electrically connected to one another. The middle electrode is insulated relative to the housing halves and electrically connected with its opposite sides to a first connecting region of a varistor. The two varistors and the middle electrode are sandwiched between the two housing halves.

2. Description of Related Art

Conventional electrical circuits and systems work without perturbations in the voltage specified for them (i.e., the rated voltage). This does not apply when overvoltages occur. Overvoltages are any voltages which are above the upper tolerance limit of the rated voltage. They mainly include transient overvoltages, which can occur due to atmospheric discharges, but also may occur due to switching actions or short circuits in power supply networks, which can be coupled galvanically, inductively or capacitively into electrical circuits. In order to protect electrical or electronic circuits, especially for electronic measurement, control and switching circuits, in which they may be used, against transient overvoltages, overvoltage protection elements were developed and have been used for years.

Due to aging and temporarily occurring overvoltages (TOV) in the range of seconds, an unwanted increase of the leakage current of the varistor at operating voltages occurs, especially in overvoltage protection elements with a varistor as the arrester. Overvoltage protection elements with a varistor as the arrester, therefore, nowadays often have a thermal disconnector by which the varistor, which is no longer properly serviceable, is electrically separated from the current path to be monitored. In the conventional overvoltage protection elements, the state of the varistor is monitored according to the principle of a temperature switch. When the varistor overheats, for example due to a leakage current which has occurred, a solder connection provided between the varistor and a disconnection means is broken, which leads to electrical disconnection of the varistor.

This overvoltage protection element is known, for example, from German Patent DE 695 03 743 T2. In the known overvoltage protection element, which has two varistors, that are located parallel to one another. The thermal disconnector is additionally connected to an optical state display so that the state of the overvoltage protection element can be read directly on site using the optical state display. For the optical state display, this overvoltage protection element has a first slide which is located in the housing and which is actuated by separating tongues which form the separating means, and interacts with a second slide which can be moved relative to a viewing port depending on the position of the first slide.

The disadvantage in the known overvoltage protection devices and overvoltage protection elements is, however, that each contact opening under operating voltages of greater than 30 volts and high current loads can produce an arc. Thus, when the solder connection is broken an arc can occur between the varistor and the separation means, which can lead to damage of components within the overvoltage protection element or of the overvoltage protection element overall, and especially of the plastic housing surrounding the varistor. Since several of these overvoltage protection elements or overvoltage protection devices are often arranged several next to one another and to other electronic devices, adjacent overvoltage protection devices or other electronic devices can often by destroyed or damaged due to an arc which occurs within the housing.

German Patent DE 601 12 410 T2 discloses an overvoltage protection device which has a varistor wafer which is located in a pot-shaped metal housing and which is braced against the bottom of the pot-shaped housing using a piston-shaped electrode. The housing is sealed with a cover which is either screwed into the pot-shaped housing or is attached by a spring ring or a clip which locks in a groove in the side wall of the housing. There is an opening in the cover through which the shaft of the electrode is routed out of the housing for electrical connection of the electrode. A second terminal for electrical connection of the overvoltage protection element to the current paths or signal paths to be protected is made on the housing. For electrical insulation of the electrode relative to the housing there is an insulating ring which is located within the housing and which likewise has an opening for the shaft of the electrode.

According to another version, the overvoltage protection device known from German Patent DE 601 12 410 T2 has two varistor wafers which are each braced against a middle wall of the cylindrical housing using a piston-shaped electrode. To connect the housing, a housing electrode clip is made on the housing. By making the housing out of aluminum, destruction of the housing when an arc occurs on the varistor is prevented. The electrical contact-making of the varistor and its arrangement in the housing and the arrangement and configuration of the electrodes make the structure and the mounting of the known overvoltage protection device, however, relatively complex.

German Patent DE 10 2007 030 653 A1, which corresponds to U.S. Pat. No. 8,089,745 B2, discloses an initially described overvoltage protection element which likewise has a metal housing consisting of two half shells. Both in the overvoltage protection element known from German Patent DE 10 2007 030 653 A1, which corresponds to U.S. Pat. No. 8,089,745 B2, and also in the one known from German Patent DE 601 12 410 T2, the problem is that the varistor wafers located within their housing are subject to tolerances, especially in their thickness so that to ensure a reliable contact-making of the connecting regions of the varistors for the two overvoltage protection elements, spring elements in the housing are used.

In the overvoltage protection element known from German Patent DE 10 2007 030 653 A1, which corresponds to U.S. Pat. No. 8,089,745 B2, according to the preferred embodiment there are two elastic contact elements at a time between one half shell of the housing and the assigned first connecting regions of a varistor. The electrical connection between the two housing half-shells and the two varistors can be implemented by a purely mechanical connection so that welding or soldering processes in the mounting of the overvoltage protection element are not necessary. Depending on the actual thickness of the two varistors, however, different contact forces arise and, as a result, adversely affect the reliable and continuous operation of the overvoltage protection element under certain circumstances. Moreover the use of elastic contact elements has a disadvantage due to the impedance of the elastic contact elements, which increases the impedance of the electrical connection to the varistors, and thus also raises the possible noise level. Moreover, the contact-making surface of the varistors with the housing half-shells is reduced, which further increases the impedance of the electrical connection.

SUMMARY OF THE INVENTION

Therefore, the object of this invention is to further develop the initially described overvoltage protection element such that a noise level that is as low as possible can be achieved with it. Moreover, the overvoltage protection element preferably should be made especially durable and long-lived, and should be built and mountable as simply and economically as possible.

This object is achieved in the initially described overvoltage protection element in that one housing half is made as a cover which has a covering section and a recessed engagement section. In the connected state of the two housing halves, the engagement section engaging the corresponding receiving space formed by the other housing half and the covering section covering the receiving space. The two housing halves are made and can be connected to one another such that in the connected state between the two housing halves there is a viewing gap having a varying width depending on the thickness of the two varistors. The maximum width of the viewing gap is, however, always smaller than the corresponding extension of the engagement section of the second housing half which is made as a cover.

The tolerances of the different thicknesses of the varistors used can be easily balanced by the execution of the viewing gap between the two housing halves, the gap width varying depending on the thickness tolerances. Based on the construction principle with a viewing gap, no additional components are needed, such as the elastic contact elements used in the conventional art, for the tolerance balancing of different varistors with different thicknesses which arise due to the production process. The required contact pressure between the varistors connected in parallel and the middle electrode, which is located between the two varistors and which makes contact with the first connecting region of the two varistors, is preferably accomplished via screwing the two housing halves to one another, i.e. the cover to the first housing half which is made as a housing shell.

In the disclosed overvoltage protection element, the middle electrode preferably has a flat section whose dimensions correspond essentially to the dimensions of the varistors, especially the dimensions of the first connecting regions of the varistors, so that the connecting regions of the two varistors can each make flat contact with one side of the middle electrode at a time. In this way, a very low-impedance electrical connection to the varistors can be accomplished so that a low noise level can also be achieved.

According to another advantageous configuration, the middle electrode consists of two metal parts which are electrically connected to one another and which are arranged parallel to one another. The two metal parts have a distance from one another at least in the region between the two varistors. In this intermediate space between the two metal parts, there is preferably a spring element by which the two metal parts are pushed apart in this region and, thus, are each pressed against the first connecting region of a varistor with their sides facing away from one another.

This configuration of the middle electrode makes it possible to locate alternative varistors with different thickness in the housing of the overvoltage protection element. Since the rated voltages of the varistors is proportional to the varistor thickness, in the housing of the overvoltage protection element, different varistors with different nominal voltages can be alternatively held and contact made with them without additional measures or changes on the housing being necessary. Preferably, the middle electrode consists of two identical angled sheets which are mounted turned by 180° to one another. In this way, the two metal parts of the middle electrode in the region outside the varistors can lie directly on one another while in the region between the two varistors they are spaced apart from one another due to the bend.

According to another teaching of the invention, which can be fundamentally implemented also in the initially described overvoltage protection element, in which the two housing halves do not form a viewing gap, there is at least one temperature-dependent short-circuit switch within the housing such that when a given boundary temperature $T_1$ is reached due to an excess heating of at least one varistor at least this varistor is short circuited. Fundamentally, here it is possible that, when a given boundary temperature is reached due to excess heating of a varistor, either the two varistors jointly or only the heated varistor and thus the two varistors are short circuited independently of one another.

As was already stated at the beginning, in varistors due to aging and frequent pulsed loading, at the end of their lives the insulating properties are diminished, as a result of which a power loss is converted in the varistor, which leads to heating of the varistor. The temperature of a varistor can rise so dramatically that there is a risk of fire. In order to prevent this dramatic heating, according to another teaching of the invention, there is at least one temperature-dependent short-circuit switch. The short-circuit switch or switches, however, short-circuit only the varistor or varistors and not as in the conventional art, in which the varistor or varistors are electrically disconnected from the current path which is to be monitored.

According to a fundamentally first embodiment of the overvoltage protection element in accordance with the invention, the two housing halves are each electrically connected to the second connecting region of a varistor. The two varistors which are connected in parallel and, on the one hand, make contact with the middle electrode located between them and, on the other hand, with the two housing halves. The housing is connectable to a reference potential and the middle electrode being connected directly or indirectly to a first terminal of the overvoltage protection element for connecting at least one active conductor to the current path or signal path to be protected.

In this embodiment there is preferably only one temperature-dependent short circuit switch which has a shorting jumper, an insulating retaining element which is mechanically connected to the shorting jumper, at least one spring element and one retaining metal. In the normal state of the varistors, i.e. when the varistors are not overheated, the shorting jumper is located spaced apart from the middle electrode, although on the retaining element a spring force of the spring element acts in the direction to the middle electrode. The retaining element is kept in this (first) position by the retaining element being supported with a spacer element which projects through an opening in the middle electrode on the retaining metal which is connected to the middle electrode via a solder connection.

If the varistors heat up, this also leads to heating of the middle electrode. At a given temperature, for example 140°, this leads to melting or breaking of the solder connection so that the shorting jumper or the retaining element is no longer held in the first position by the retaining metal. The spring force of the spring element moves the retaining element and, thus, also the shorting jumper into a second position in which the shorting jumper makes contact both with the middle electrode and also the housing so that the varistors are short circuited via the shorting jumper.

According to one preferred embodiment, the shorting jumper is made essentially U-shaped so that the shorting jumper has one U-back and two U-legs. In the case of a short circuit, the U-back makes contact with the middle electrode and the two U-legs make contact with the housing. For this purpose, on the housing corresponding contact, sections are formed which make contact with the U-legs in the case of a short circuit.

According to one fundamentally second embodiment of the disclosed overvoltage protection element, the middle electrode is connected to the first terminal for connection of at least one active conductor of the current path or signal path to be protected and there is one connecting metal at a time between the two housing halves and the facing second connecting regions of the two varistors. The connecting metals are each insulated from the housing halves by an insulating element. In this embodiment, the two varistors, which are connected in parallel, make contact on the one hand with the middle electrode, which is located between them and, on the other hand, with the connecting metal. The connecting metal is connected directly or indirectly to the housing. The two varistors, however, are not connected directly flat to the two housing halves, as in the above described first embodiment, but are preferably likewise connected flat to one connecting metal at a time.

In this embodiment, preferably one short-circuit switch at a time is assigned to the two varistors. Each short-circuit switch has a flexible conductor section, an actuating pin and a spring element. The first end of the flexible conductor section is electrically connected to the contact section on the assigned connecting metal. The second end of the flexible conductor section is connected to one end of the pertinent actuating pin. In the normal state of the varistor assigned to the short-circuit switch, the second end of the flexible conductor section is spaced apart from a contact section which is on the middle electrode. The spring force of the spring element acts in the direction of the contact section of the middle electrode acting on the actuating pin. The spring force of the spring element in the normal state opposes a thermosensitive element by which the actuating pin is kept in its first position against the spring force of the spring element.

If the varistor heats up, this leads to softening of the thermosensitive element at a given temperature so that the second end of the flexible conductor section is moved by the spring force of the spring element acting on the actuating pin into a second position in which the second end of the flexible conductor section makes contact with the contact section of the middle electrode. The varistor is then short circuited via the flexible conductor section since the middle electrode, which is connected to the first connecting region of the varistor, is connected in an electrically conductive manner via the flexible conductor section to the connecting metal which is connected to the second connecting region of the varistor.

In this version preferably, the actuating pins are each guided in one hole in the assigned contact section of the connecting metal and the spring elements are each located between the first end of the actuating pins and the contact section of the connecting metal. In the normal state of the varistors, the spring elements can be compressed against their spring force, and the actuating pins are held in their first position by there being in each of the actuating pins one thermosensitive pin which is located on the side of the contact section of the connecting metal opposite the spring element and adjoining it. If the varistor heats up, this also leads to heating of the connecting metal, which makes contact with the varistor and, thus, also heating of the contact section of the connecting metal. This leads to the thermosensitive pin likewise heating up and, thus, losing its strength starting at a given temperature so that the pin can no longer keep the pin of the actuating pin in the first position against the spring force of the spring element.

According to one preferred version of this embodiment, a back-up fuse, e.g., a fusible link, is assigned to the two varistors. One terminal of the back-up fuses is connected in an electrically conductive manner to the assigned connecting metal. The second terminal of the back-up fuse is directly or indirectly connected to the housing of the overvoltage protection element.

By integrating the back-up fuses into the housing of the overvoltage protection element, the use of additional, separate back-up fuses can be avoided. Moreover this embodiment has the advantage that only the overloaded varistor is short circuited and then, when a short-circuit current occurs, it is disconnected by the back-up fuse from the current path or signal path which is to be monitored and thus from the supply voltage. If an overloaded varistor is disconnected from the supply voltage, the protective function of the overvoltage protection element is reduced, but basic protection remains ensured by the second varistor which continues to be active.

Fusible links, which are generally used as back-up fuses, are only conditionally resistant to pulsed currents according to the characteristic melt integral. Because in the above described embodiment there are two short-circuit switches and two back-up fuses, an overvoltage-dependent pulsed current is distributed between the two fuses so that the rated values of the fuse can be made smaller. Moreover, in the case of a short circuit, lower short circuit currents with a short current flow time form, as a result of which the voltage dip caused by the short-circuit current is reduced. In this way, system fuses are less stressed, the network quality is improved, and overall availability of the system is increased.

Alternatively, the use of a back-up fuse and a thermal short-circuit switch (only), a fuse with a fusible element can be used, which is then made and arranged such that it assumes both the function of the back-up fuse and also the function of the thermal short-circuit switch. The fuse, which is connected in an electrically conductive manner to a varistor for this purpose, is made such that, when a given boundary temperature is reached due to excess heating of the varistor and also when a short circuit occurs, the fuse triggers and, thus, disconnects the assigned varistor electrically from the circuit.

The fuse for this purpose preferably has a fusible element of a low-melting material, for example tin, so that the fuse, in contrast to conventional fuses, triggers not only when a short circuit current occurs and also for excessive heating by the fusible element that is destroyed by the short-circuit current or the heating. An arc which occurs within the fuse is extinguished by suitable extinguishing aids, for example sand.

According to another teaching of the invention, the initially described overvoltage protection element has another arrester, e.g., a gas-filled surge arrester which is located between the terminal of the overvoltage protection element and the parallel connection of the two varistors. According to this teaching of the invention, within the housing of the overvoltage protection element, there are not only the two varistors connected in parallel, but moreover, an additional arrester, which is preferably a gas-filled surge arrester. The additional arrester is located in series to the parallel connection of the two varistors.

In the fundamentally first embodiment of the overvoltage protection element in which the two housing halves are each electrically connected to the second connecting region of one varistor, the first terminal of the other arrester is connected in an electrically conductive manner to the first terminal of the overvoltage protection element for connecting at least one active conductor of the current path or signal path to be protected and the second terminal of the other arrester to the middle electrode. In this embodiment, the first terminal of the overvoltage protection element, to which an active conductor of the current path or signal path to be protected can be connected, is electrically connected to the first terminal of the other arrester, the second terminal of the other arrester to the middle electrode, the middle electrode with its sides opposite one another electrically to the first connecting region of the two varistors and the two varistors with their second connecting region are connected to one housing half at a time. The housing is connectable to the reference potential via the second terminal.

The arrangement of another arrester, e.g., a gas-filled surge arrester, between the terminal of the overvoltage protection element for the active conductor and the middle electrode has the advantage that first the characteristic ignition voltage of the other conductor must be exceeded before there is an overvoltage on the varistors. This leads to the varistors being loaded only at the relevant overvoltages which endanger the system or the current path or signal path to be protected. Smaller voltage peaks which are below the ignition voltage of the other arrester thus do not lead to loading of the varistors, which leads to slower aging and damage of the varistors. Moreover the arrangement of another arrester has the advantage that the overvoltage protection element also still has an overvoltage protection function when one varistor or two varistors are short circuited.

In the fundamentally second embodiment of the overvoltage protection element, the middle electrode is connected to a first terminal for connecting at least one active conductor of the current path or signal path to be protected, and in which there is one connecting metal at a time between the two housing halves and the facing second connecting region of the two varistors. The connecting metals are each insulated by an insulation element from the housing halves. The first terminal of the other arrester is connected directly or indirectly to the housing. The second terminal of the other arrester is connected to the two connecting metals. Thus, in this embodiment the first terminal of the overvoltage protection element, which is connected to an active conductor is connected to the middle electrode. The middle electrode with its opposite sides is electrically connected to the first connecting region of the two varistors, the two varistors with their second connecting region to the two connecting metals, the two connecting metals each directly or indirectly to the second terminal of the other arrester and the first terminal of the other arrester is connected to the housing of the overvoltage protection element. The housing is also connectable to the reference potential via a second terminal.

As was stated above, the second terminal of the other arrester is connected directly or indirectly to the two connecting metals. If the second terminal of the other arrester is directly connected to the two connecting metals, between the second terminal and the two connecting metals there is permanently an electrically conductive connection. According to one preferred configuration of this embodiment the second terminal of the other arrester is, however, (only) indirectly connected to the two connecting metals by there being one back-up fuse, especially a fusible link, between the second terminal of the other arrester and the two connecting metals. The connecting metals each have one contact section which is connected in an electrically conductive manner to the first terminal of the assigned back-up fuse, while the second terminals of the two back-up fuses are connected in an electrically conductive manner to the second terminal of the other arrester.

Fundamentally, both the second and also the third teaching of the invention can be implemented both independently of one another and also independently of the first teaching of the invention in the initially described overvoltage protection element. But preferably all three teachings of the invention are implemented together in an overvoltage protection element so that both the housing has a viewing gap and also within the housing there are at least one temperature-dependent short-circuit switch and another arrester.

As has already been stated above, that the metallic housing can be connected to the reference potential via a second terminal. Structurally the second terminal can be implemented according to one embodiment in that the housing has an attachment region via which the housing can be connected to a mounting plate as the reference potential. Alternatively or additionally, the housing, e.g., the first housing half, has a protective conductor terminal as the second terminal via which (in addition) one protective conductor can be electrically connected to the housing.

The first terminal of the overvoltage protection element for connecting at least one active conductor of the current path or signal path to be protected according to one preferred embodiment can be formed by a high current bushing terminal which is located preferably on one face side, e.g., the top, of the first housing half. By using a high current bushing terminal, a contact-protected installation of the connecting line or of the connecting lines is possible, the potential being routed insulated into the housing with the capacity to carry high currents. The clearance and creepage distances in this region can be further increased by using additional molded insulating parts within the housing.

Alternatively to using a high current bushing terminal, especially in the second embodiment of the overvoltage protection element, a terminal electrode connected preferably integrally to the middle electrode can be routed through an insulating housing penetration into the housing interior.

According to a last preferred configuration of the overvoltage protection element, an optical display device and, preferably, in addition a long-distance transmitting display device are made or arranged on the housing for display of the state of the varistors. Preferably, the display device has a circuit board on which there are several LEDS. Moreover, the display device has several temperature fuses which are in thermal contact with the middle electrode. If the temperature of the middle electrode reaches a first given boundary temperature, the first temperature fuse triggers, which leads to a preferably green LED that displays the fault-free state being extinguished. At the same time, a second preferably red LED starts to light, as a result of which a fault case is displayed. A second temperature fuse which is preferably provided can be interrogated via a plug-in circuit board connector as a long-distance transmitting function display. Moreover there can be a third temperature fuse which is matched in its trigger temperature to the switching of the short-circuit switch so that the switching of the short-circuit switch or reaching the switching temperature of the short-circuit switch can be transmitted over a long distance.

In particular, there is a plurality of possibilities for embodying and developing the overvoltage protection element in accordance with the invention. In this respect, reference is made to the following description of preferred exemplary embodiments in conjunction with the drawings.

DETAILED DESCRIPTION OF THE INVENTION

The figures show two fundamental embodiments of an overvoltage protection element 1. A first embodiment is shown e.g., in FIGS. 1, 2, 3a, and 3b, and a second embodiment in FIGS. 5 and 6. In contrast to the illustrated embodiments, not all the components shown in the housing need be implemented in the overvoltage protection element 1. Moreover individual features shown in one embodiment can also be implemented in the other embodiment. Also especially the features shown in FIGS. 4 and 7 can also be implemented both in the first embodiment and also in the second embodiment.

Figure 6:
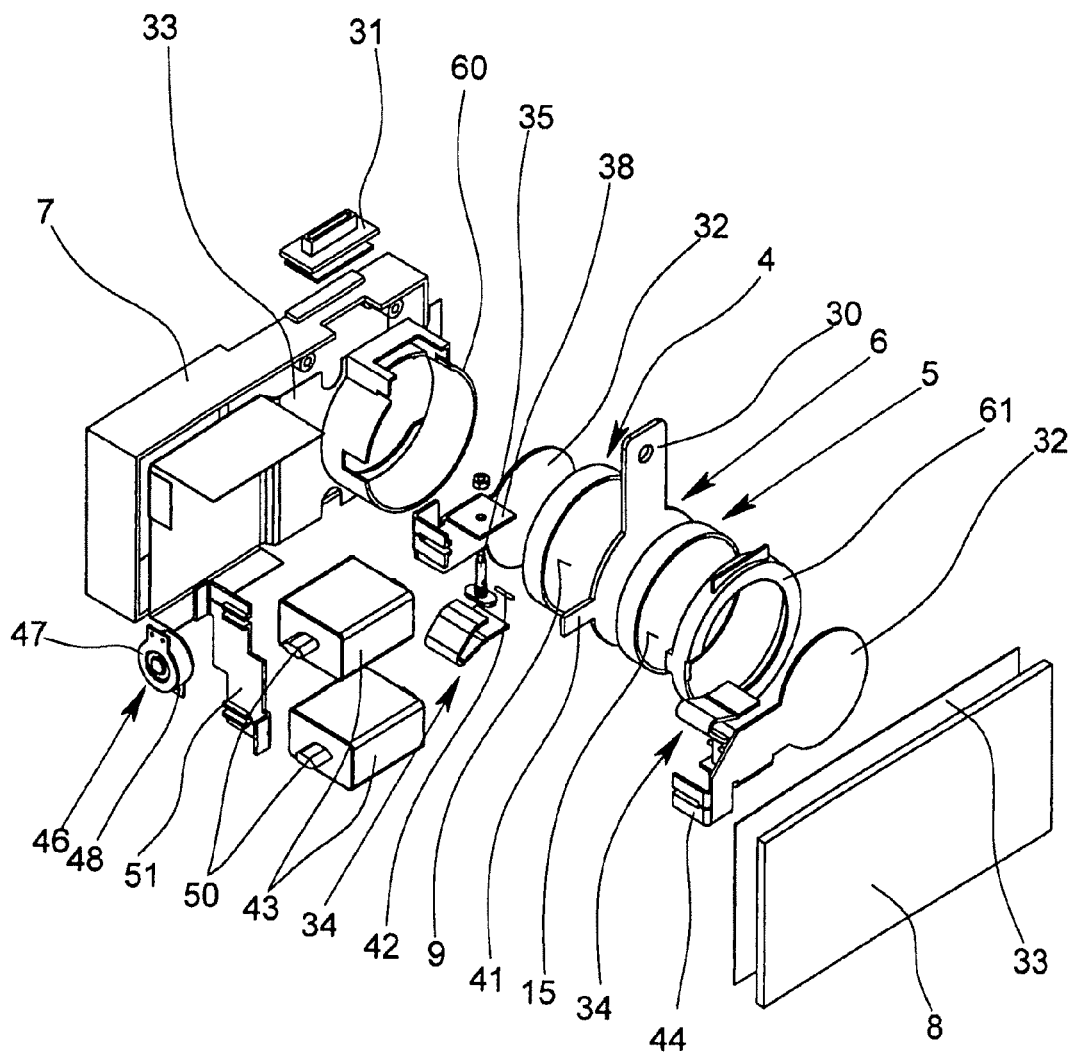
FIG. 6 shows an exploded diagram of the overvoltage protection element according to FIG. 5.

The overvoltage protection element 1, as shown in the figures, has a housing with terminals 2, 3 for electrical connection of the overvoltage protection element 1 to a current path or signal path which is to be protected. Within the housing there are two varistors 4, 5, which are connected electrically in parallel and which each have a circular base surface, the diameter of the two varistors 4, 5, aside from tolerance-dictated deviations, being the same. Between the two varistors 4, 5, there is a middle electrode 6 which is insulated relative to the two housing halves 7, 8 which form the housing. The middle electrode 6, with its opposing sides, is connected in an electrically conductive manner to the first connecting region 9 of the two varistors 4, 5, the two varistors 4, 5 and the middle electrode 6, as is apparent especially from FIGS. 2 and 6, are located sandwiched between the two housing halves 7, 8.

Figure 2:
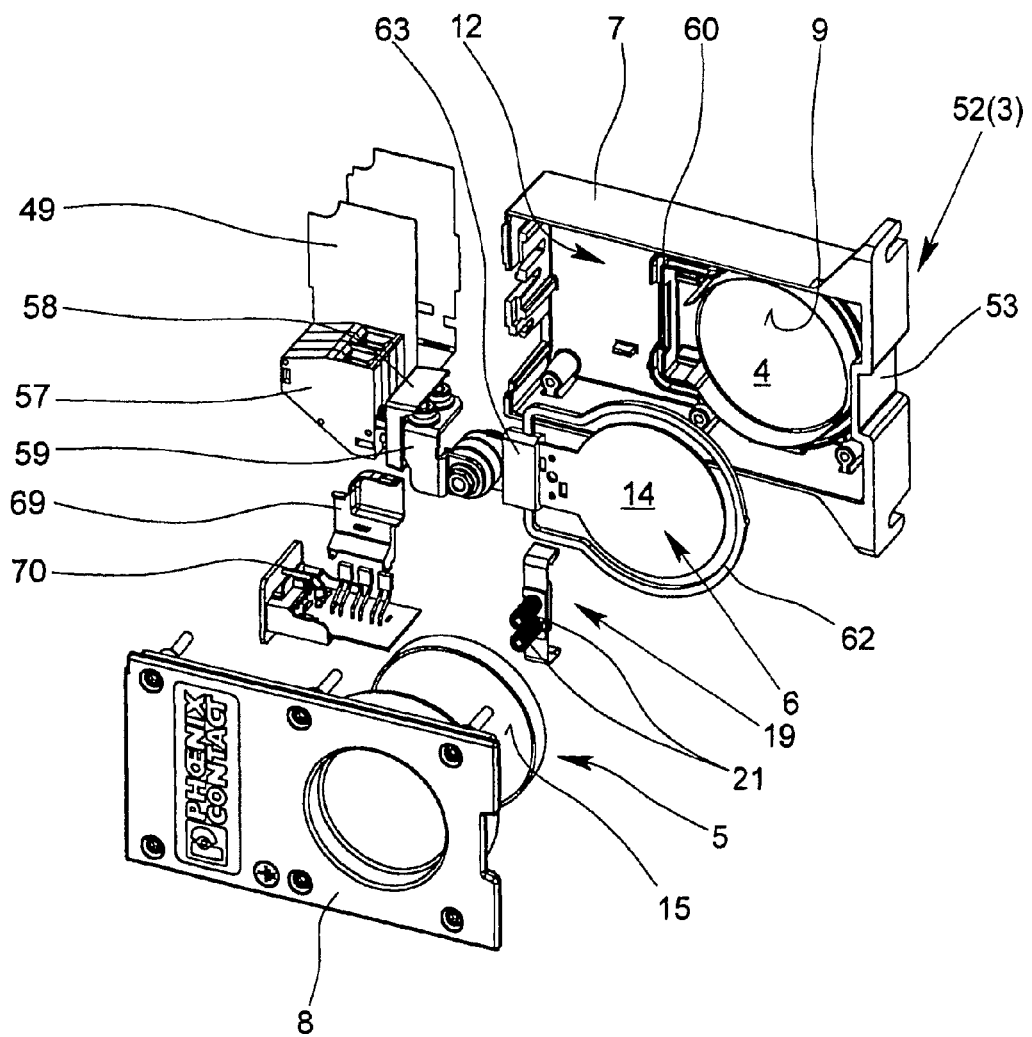
FIG. 2 shows an exploded diagram of the overvoltage protection element according to FIG. 1.

In particular, it is apparent from FIGS. 2 and 3 that the two housing halves 7, 8 are made differently. The second housing half 8 being made as a cover which has a covering section 10 and an recessed engagement section 11. In the connected state of the two housing halves 7, 8 (compare FIG. 3), the engagement section 11 of the cover 8 engages the corresponding receiving space 12 formed by the first housing half 7, while the receiving space 12 is covered by the covering section 10. It is moreover apparent from FIG. 3 that in the connected state of the two housing halves 7, 8. there is a viewing gap 13 between the two housing halves 7, 8. The width B of the viewing gap 13 varies depending on the thickness of the two varistors 4, 5. The two housing halves 7, 8 are made such that, in any case when using the allowable varistors 4, 5, the maximum width B of the viewing gap 13 is always smaller than the corresponding extension, i.e. the width b of the engagement section 11.

A production-dictated thickness tolerance of the varistors 4, 5 can be easily balanced by the execution of the viewing gap 13 without additional elements being necessary for the tolerance balancing. The required contact pressure between the two housing halves 7, 8 and the varistors 4, 5 or between the varistors 4, 5 and the middle electrode 6 can be easily achieved by screwing down the two housing halves 7, 8.

The middle electrode 6 has a flat section 14 whose dimension or whose diameter corresponds essentially to the diameter of the varistors 4, 5 so that the first connecting regions 9 of the varistors, which are opposite the two sides of the middle electrode 6 and which are provided with a metal coating make flat contact with the middle electrode 6. In the embodiment according to FIGS. 1 and 2, the varistors 4, 5, with their second connecting region 15, make contact directly with the two housing halves 7, 8 so that the two connecting regions 9, 15 of the two varistors 4, 5 make flat contact, as a result of which a low-impedance connection of the varistors 4, 5 is achieved. The flat connection of the two varistors 4, 5 with the two housing halves 7, 8 leads, moreover, to optimum heat dissipation from the varistors 4, 5 to the housing, which benefits the performance and the service life of the varistors 4, 5.

Figure 3A:
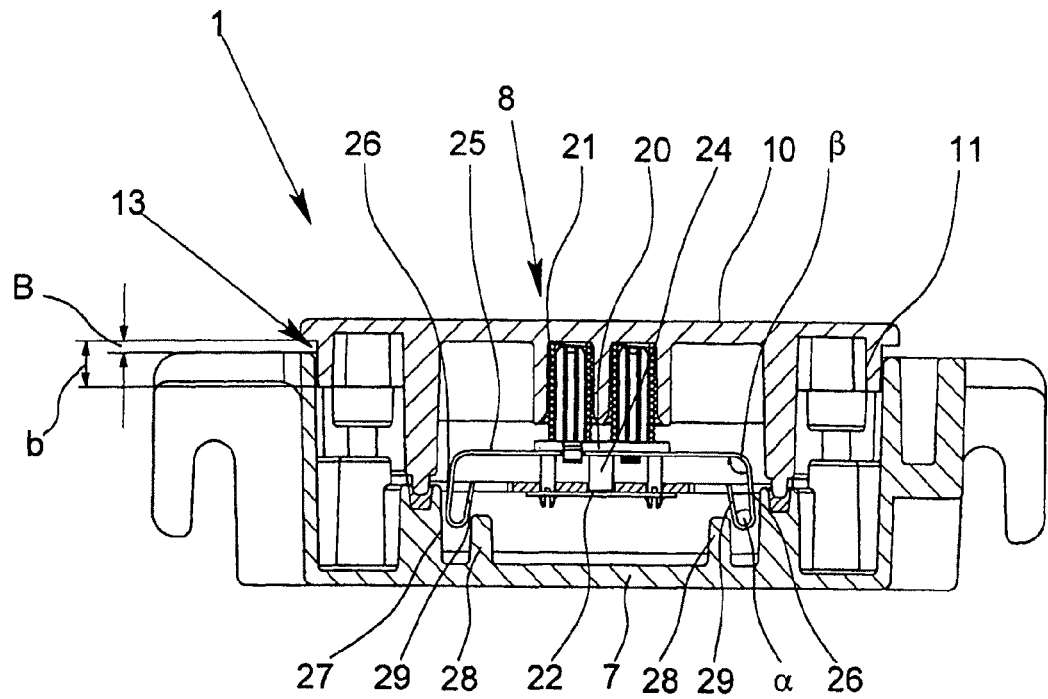
FIGS. 3a and 3b show a section of the overvoltage protection element, with a shorting jumper in the normal state of the varistors and in the case of a short circuit.
Figure 3B:
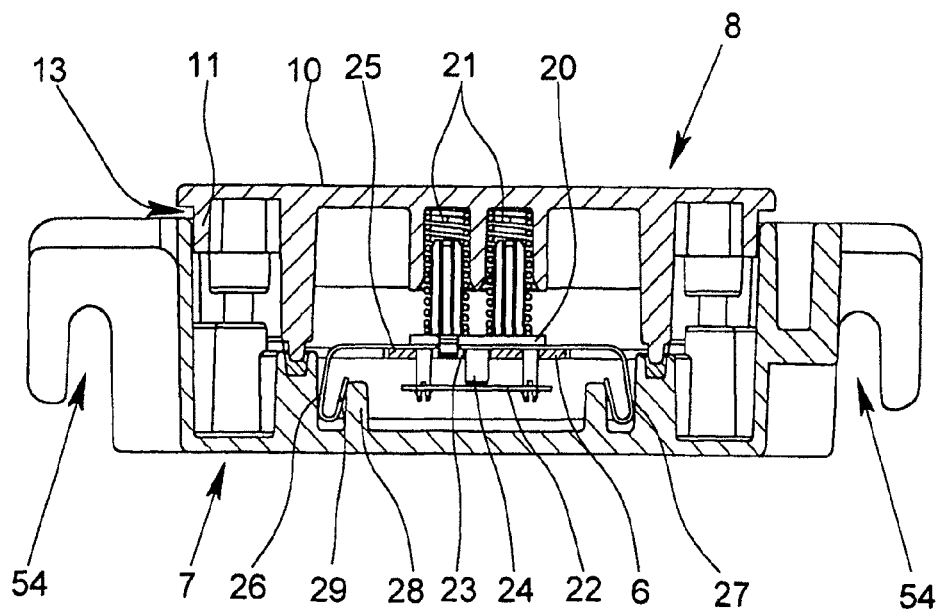
Figure 4:
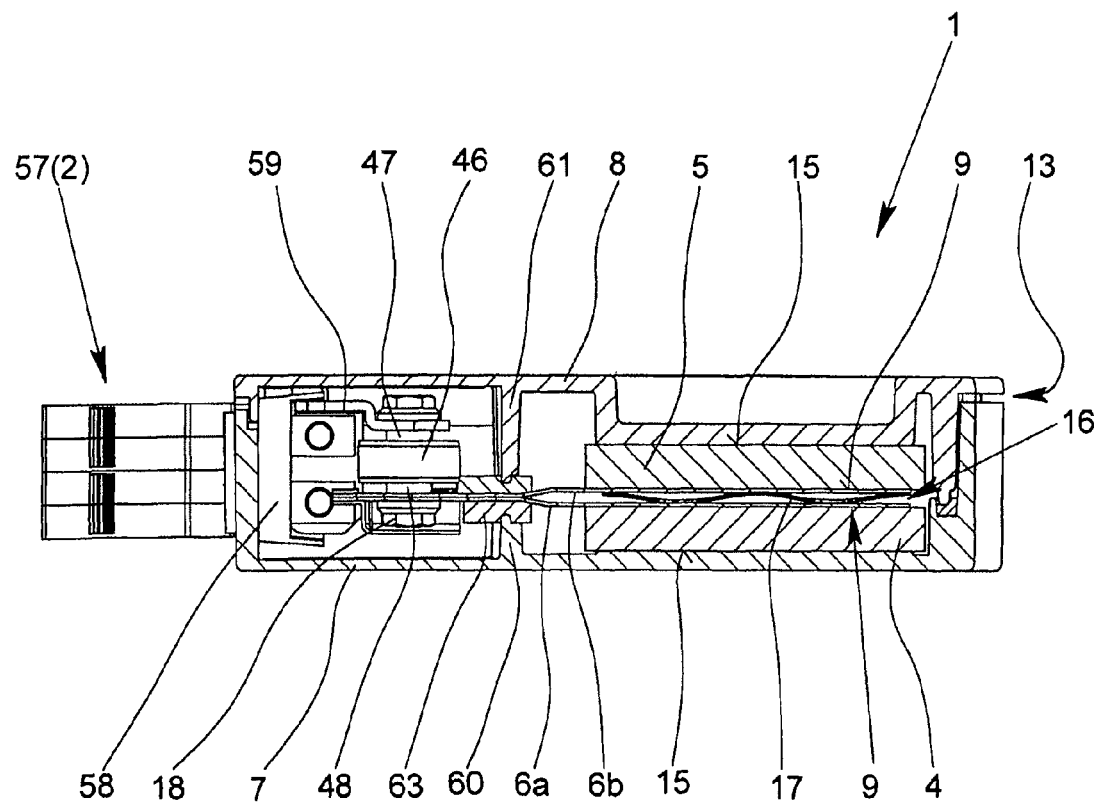
FIG. 4 shows a section of one version of the overvoltage protection element according to FIG. 1.

FIG. 4 shows one version of the overvoltage protection element 1, according to FIGS. 1, 2, 3a, and 3b, in which the middle electrode 6 consists of two metal parts 6a, 6b which are electrically connected to one another, and which are arranged parallel to one another. In the region between the two varistors 4, 5, the two metal parts 6a, 6b are spaced apart from one another. The intermediate space 16 formed in this way, there is a spring element 17, which is preferably a sinuous spring. The spring element 17 pushes the two metal parts 6a, 6b apart so that the two metal parts 6a, 6b, with their sides facing away from one another, are pressed against the first connecting region 9 of a varistor 4, 5 and thus the two varistors 4, 5 make contact. In the region located outside the two varistors 4, 5, the two metal parts 6a, 6b conversely are directly connected flatly to one another, and the two metal parts 6a, 6b are fixed in this region via a lock nut 18. The production of the two metal parts 6a, 6b is especially simple in that the two metal parts 6a, 6b are made the same and are bent or angled and are mounted turned only 180° to one another.

In the exemplary embodiments of the overvoltage protection element 1 in accordance with the invention, which are shown in the figures, there is at least one temperature-dependent short-circuit switch within the housing so that when a given boundary temperature $T_1$ is reached due to an excess heating of at least one varistor 4, 5 either the two varistors 4, 5 (embodiment 1) or only the heated varistor 4, 5 (embodiment 2) is short circuited. This prevents a risk of fire due to overly dramatic heating of a varistor 4, 5 which could lead moreover to destruction of one varistor 4, 5, but moreover also to destruction of other components and optionally to damage of adjacent devices or even to endangerment of individuals.

In the first embodiment according to FIGS. 1, 2, 3a, and 3b, within the housing there is only one short circuit switch which has a shorting jumper 19, an insulating retaining element 20 which is mechanically connected to the shorting jumper 19, two spring elements 21 and one retaining metal 22. In the normal state of the varistors 4, 5 which is shown in FIG. 3a, the shorting jumper 19 is located spaced apart from the middle electrode 6, although the retaining element 20 is exposed to a spring force in the direction to the middle electrode 6 by the spring elements 21 which are compressed against their spring force. In the normal state of the varistors 4, 5 the shorting jumper 19 is kept in the first position spaced apart from the middle electrode 6 such that the retaining element 20 is supported with a spacer element 24 which projects through an opening 23 in the middle electrode 6 on the retaining metal 22, which is connected to the bottom of the middle electrode 6 via a solder connection.

If the varistors 4, 5 heat up to excess, this also leads to heating of the middle electrode 6, as a result of which starting from a certain temperature of for example 140° C., the solder connection between the middle electrode 6 and the retaining metal 22 is broken. The retaining metal 22 and the solder connection can, thus, no longer apply the counterforce to the spring force. In this way, the retaining metal 22 due to the spring force of the spring element 21 is forced down by the spacer element 24 of the retaining element 20 away from the middle electrode 6 and the shorting jumper 19, which is held by the retaining element 20 is pressed onto the middle electrode 6. In the second position of the retaining element 20, the shorting jumper 19 makes contact both with the middle electrode 6 and also the first housing half 7 so that the varistors 4, 5 are short circuited via the shorting jumper 19 (FIG. 3b). Since the retaining metal 22 is held via catch points on the two guide pins, which are located on the retaining element 20, the retaining metal 22 is also prevented from dropping after the solder connection is broken.

The shorting jumper 19 in the normal state of the varistors 4, 5 is located mechanically unloaded in the housing, specifically accommodated by the retaining element 20. Since the shorting jumper 19 for breaking the solder connection between the middle electrode 6 and the retaining metal 22 need not be made elastic, the shorting jumper 19, with its cross section and its conduction value, can be matched optimally to the electrical requirements of the overvoltage protection element 1 in the case of a short circuit. Since the spring elements 21 are tensioned only during mounting by the closing of the cover 8, a simple and, thus, economical mounting of the individual components in the first housing half 7 is possible since all components can be used free of mechanical stresses, and additional fixing parts are, thus, unnecessary.

As FIGS. 3a and 3b show, the shorting jumper 19 has one U-back 25 and two U-legs 26 which in case of a short circuit adjoin the corresponding contact sections 27 of the housing part 7. Adjacent to the contact sections 27 on the housing half 7, contact ribs 28 are formed which in case of a short circuit likewise make contact with the U-legs 26 of the shorting jumper 19. For this purpose the ends of the U-legs 26 each have an end section 29 which has been bent back and which adjoins one contact rib 28 at a time in the case of a short circuit.

The dynamic current forces in the case of a short circuit are advantageously used to improve the contact properties by the U-shaped configuration of the shorting jumper 19 and the formation of the bent-back end sections 29 of the U-legs 26. In the U-legs 26 and the bent-back end sections 29, which have an angle $\alpha$ to one another, in the case of a short circuit an opposite current flows. This leads to the U-legs 26 and the bent-back end sections 29 being bent apart from one another by the current forces, i.e. the angle $\alpha$ is increased. This leads to an increase of the contact forces between the shorting jumper 19 and the housing part 7 both on the contact sections 27 and also on the contact ribs 28. Moreover the contact pressure between the U-legs 26 and the contact sections 27 is also increased by the angle between the U-back 25 and the two U-legs 26 being likewise increased by the current forces which are caused by the short circuit current flowing through the shorting jumper 19. Altogether a good current transition between the shorting jumper 19 and the housing half 7 is, thus, achieved by the preferred configuration of the shorting jumper 19 and the configuration of the housing half 7.

Figure 5:
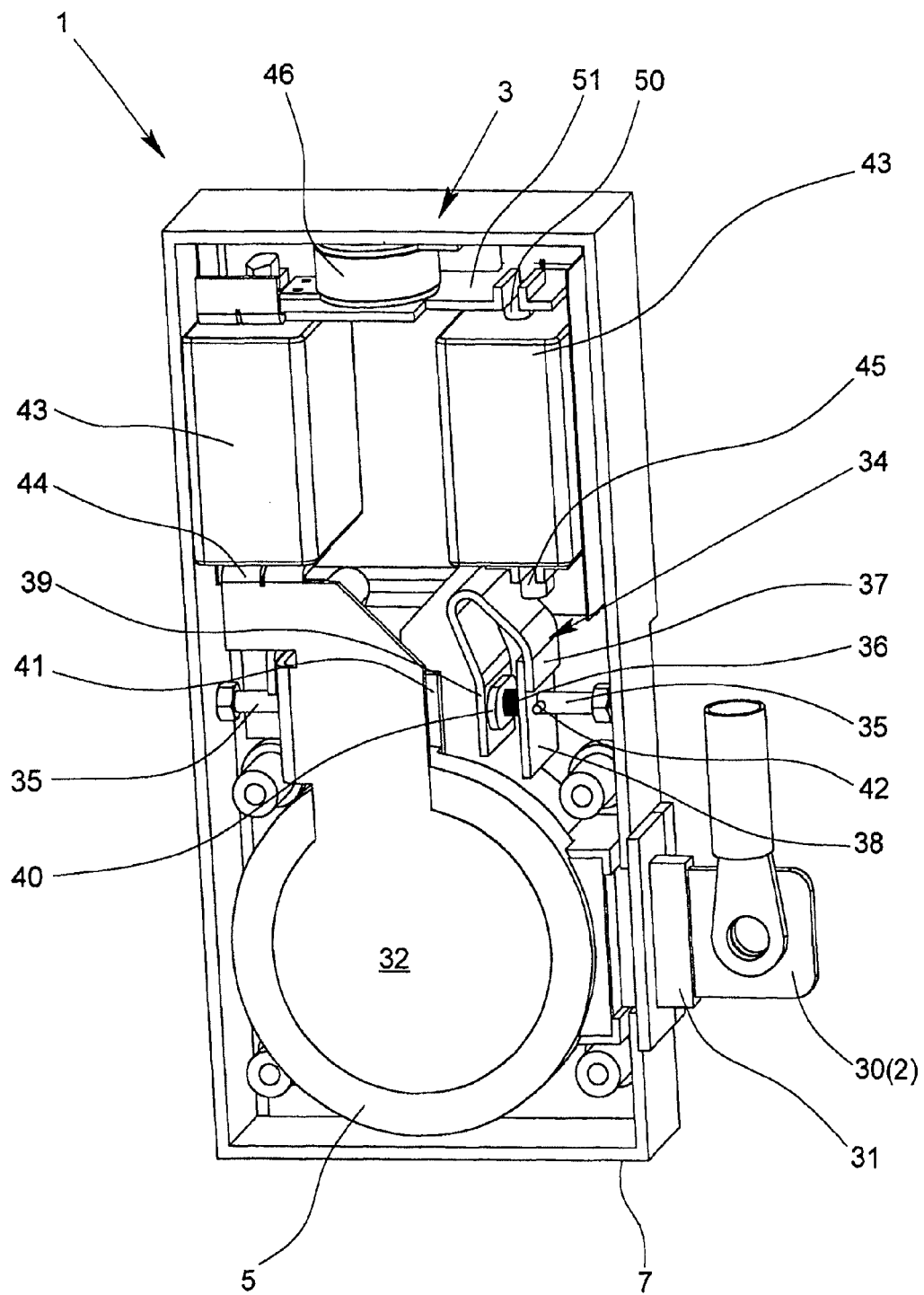
FIG. 5 shows a second exemplary embodiment of an overvoltage protection element in accordance with the invention, with the cover removed.

In the second embodiment according to FIGS. 5 and 6, one short-circuit switch at a time is assigned to the two varistors 4, 5. In this embodiment the middle electrode 6 is connected to a connection electrode 30, which is guided through one housing penetration 31 insulated into the housing interior. The middle electrode 6 can be connected to an active conductor via the connecting electrode 30. The second connecting regions 15 of the two varistors 4, 5 each make contact with the connecting metal 32 which is located on the side of the varistors 4, 5 facing away from the middle electrode 6. Between the housing halves 7, 8 and the connecting metals 32 there is one insulating element 33 at a time which can be formed for example by a silicone film or an insulating paper, as a result of which the two connecting metals 32 are insulated relative to the housing halves 7, 8.

The two short-circuit switches have a flexible conductor section 34, an actuating pin 35 and a spring element 36. The first end 37 of a flexible conductor section 34 is connected to one contact section 38 of a connecting metal 32 and the second end 39 of the flexible conductor section 34 is connected to one end 40 of the actuating pin 35. In the normal state of the assigned varistor 4, 5 (compare FIG. 5), the second end 39 of the flexible conductor section 34 is spaced apart from one contact section 41 of the middle electrode 6. The spring element 36, surrounding a section of the actuating pin 35, is located between the contact section 38 of the connecting metal 32 and the plate-shaped end 40 of the actuating pin 35, the spring element 36 being compressed against its spring force. The actuating pin 35 is kept in this first position against the spring force of the spring element 36 by a thermosensitive element 42 in the form of a pin.

If the varistor 4, 5 is heated up, this likewise leads to a heating of the assigned connecting metal 32 and of the contact section 38, as a result of which the thermosensitive element 42 likewise heats up until it loses its strength when a certain boundary temperature is reached so that it can no longer apply the counterforce to the spring force of the spring element 36. The actuating pin 35 is forced down by the spring element 36, as shown in FIGS. 3a and 3b, and thus the second end 39 of the flexible conductor section 34 is moved into a second position in which the second end 39 makes contact with the contact section 41 of the middle electrode 6 so that the varistor 4, 5 is short circuited via the flexible conductor section 34. The actuating pin 35 is routed in a hole formed in the contact section 38 of the connecting metal 32. The material for the thermosensitive pin 42 can be a plastic or a metal which at a predefined temperature loses its strength so that the desired short circuit of the overheated varistor 4, 5 occurs by the middle electrode 6 being connected in an electrically conductive manner to the connecting metal 32 via the flexible conductor section 34.

In the embodiment of the overvoltage protection element 1, as shown in FIGS. 5 and 6, a back-up fuse 43 is assigned to each of the two varistors 4, 5. Here a corresponding contact section 44 of the connecting metal 32 makes contact with one first terminal 45 of the assigned back-up fuse 43.

Figure 1:
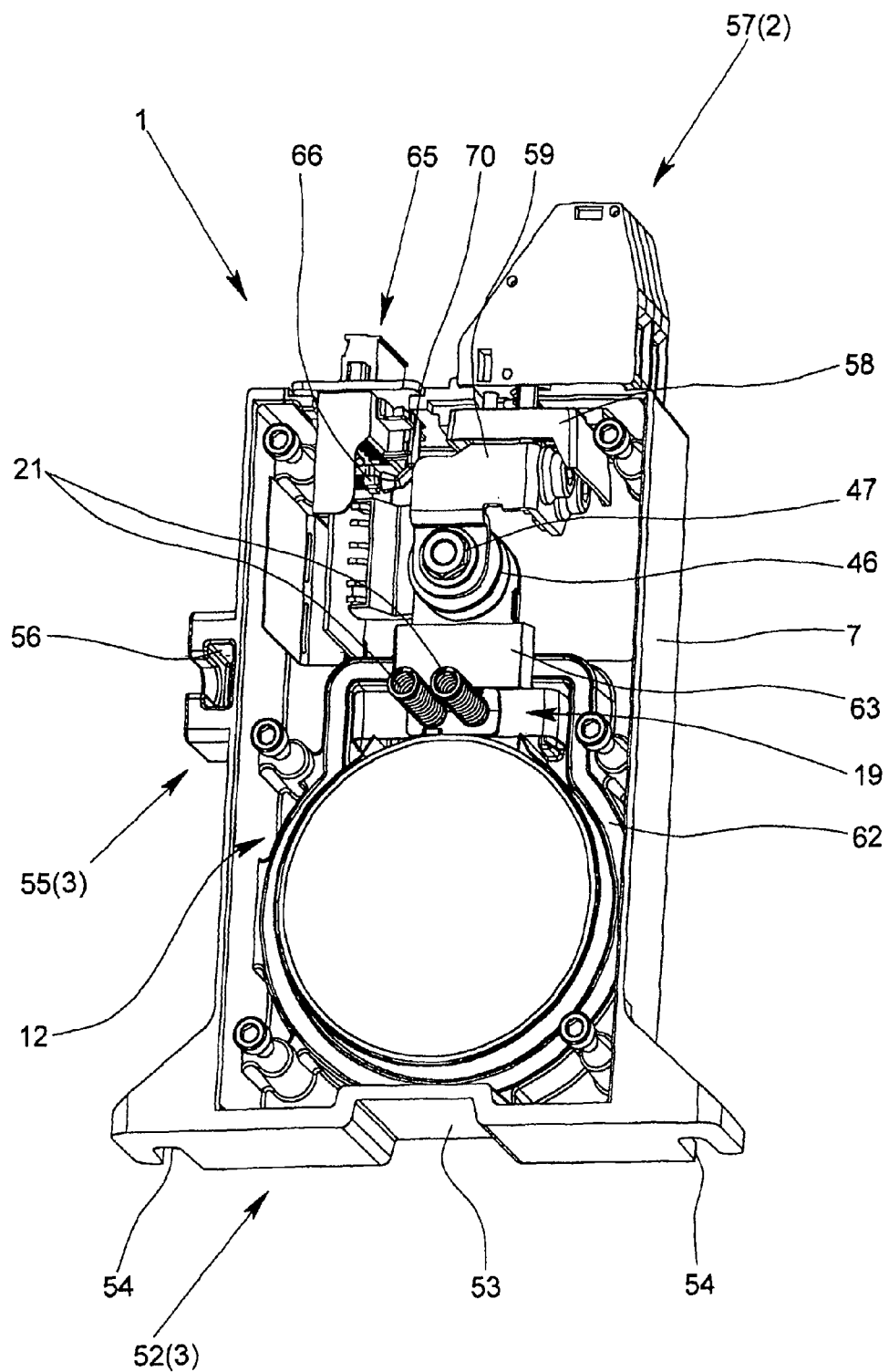
FIG. 1 shows a first exemplary embodiment of an overvoltage protection element in accordance with the invention, with the cover removed.

Both in the embodiment shown in FIGS. 1 and 2 and also in the embodiment of the overvoltage protection element 1 shown in FIGS. 5 and 6, in addition to the two varistors 4, 5 there is a gas-filled surge arrester 46 as another arrester in the housing. The gas-filled surge arrester 46 is located in series to the parallel connection of the two varistors 4, 5. Because a gas-filled surge arrester 46 is series-connected to the varistors 4, 5, which are connected in parallel, the overvoltage protection element 1, also has an overvoltage protection function if one varistor or the two varistors 4, 5 are short circuited. If after short circuiting of the varistors 4, 5, an overvoltage occurs, this leads to ignition of the gas-filled surge arrester 46 so that a device or a system for whose protection the overvoltage protection element 1 is used is not damaged by the overvoltage.

In the exemplary embodiment according to FIGS. 1 and 2, the first terminal 47 of the gas-filled surge arrester 46 is connected in an electrically conductive manner to the first terminal 2 of the overvoltage protection element 1 for connection of one active conductor and the second terminal 48 is connected to the middle electrode 6. In the region of the gas-filled surge arrester 46 there is additional insulation 49 within the housing which additionally insulates at least the other surge arrester 46 and the connecting region of the first terminal 47 of the surge arrester 46 to a first terminal 2 of the overvoltage protection element 1 relative to the housing. In this way, the clearance and creepage distances are increased so that the gas-filled surge arrester 46 can be mounted in a reduced installation space.

In the exemplary embodiment according to FIGS. 5 and 6, the first terminal 47 of the gas-filled surge arrester 46 is conversely connected to the housing and, more precisely, to the housing half 7. The second terminal 48 is connected to the two connecting metals 32 via the two back-up fuses 43. So that the two back-up fuses 43 can be electrically connected in parallel to the second terminal 48 of the gas-filled surge arrester 46, there is a contact metal 51 between the second terminal 48 of the gas-filled surge arrester 46 and the second terminals 50 of the back-up fuses 43.

In one version not shown here according to FIGS. 5 and 6, the two thermal short-circuit switches and the two back-up fuses 43 are each replaced by one fuse with one fusible element. The two fuses are then connected, on one hand, via a connecting metal 32 to one varistor 4, 5 and, on the other hand, via the contact metal 51 to the gas-filled surge arrester 46. Heating of a varistor is thus transferred to the fuses so that the fusible element consisting of a low melting material is thermally destroyed. In the case of a short circuit, the fusible element is destroyed by the short-circuit current which is then flowing so that in both cases the assigned varistor is electrically separated from the circuit.

In order to be able to connect the metallic housing to the reference potential (PE), the housing half 7 according to FIGS. 1 and 2 as a second terminal 3 has an attachment region 52 with which the housing half 7 can be attached to a mounting plate. On the bottom of the attachment region 52, a depression 53 is formed in the housing half 7 with which a mounting rail, which may be present, can be roofed. With the aid of the screws used in the attachment grooves 54, the housing can then be reliably attached, at the same time an electrical connection of the housing half 7 to the mounting plate taking place. In addition, laterally on the housing half 7, a protective conductor terminal 55, as a second terminal 3, is formed via which a protective conductor can be electrically connected to the housing. The protective conductor terminal 55 for this purpose has a receiving groove 56 into which a screw can be inserted and locked for connection of a ring cable lug which is connected to a protective conductor and can be pressed against the side wall of the housing half 7. In the exemplary embodiment according to FIGS. 5 and 6, a corresponding attachment region and preferably also a protective conductor terminal can be made as the second terminal 3.

In the exemplary embodiment according to FIGS. 1 and 2, on the top of the housing half 7, a high current bushing terminal 57, as a first terminal 2, is attached via which the potential of an active conductor is routed insulated into the housing interior with the capacity to carry high currents. An insulating part 58 increases the clearance and creepage distances in this region, in addition, and is used at the same time as a torque support when the conductors are connected. The two terminals of the high current bushing terminal 57 are electrically connected to the first terminal 47 of the gas-filled surge arrester 46 via an elbow coupling 59. The terminals of the high current bushing terminal 57 can be wired as a parallel connection.

FIGS. 1 and 2, moreover, show that within the housing a two-part inner housing is formed which surrounds at least the varistors 4, 5, the section 14 of the middle electrode 6 and the short-circuit switches and which consists of a first housing part 60 that is connected to the first housing half 7, and a second housing part 61 that is connected to the cover 8. In order to achieve complete sealing of the inner housing, a sealing cord 62 is inserted into one groove in the first housing part 60 and an insulating penetration 63, through which the middle electrode 6 is inserted into the inner housing and, thus, insulated relative to the housing, is slipped on the middle electrode 6.

Figure 7:
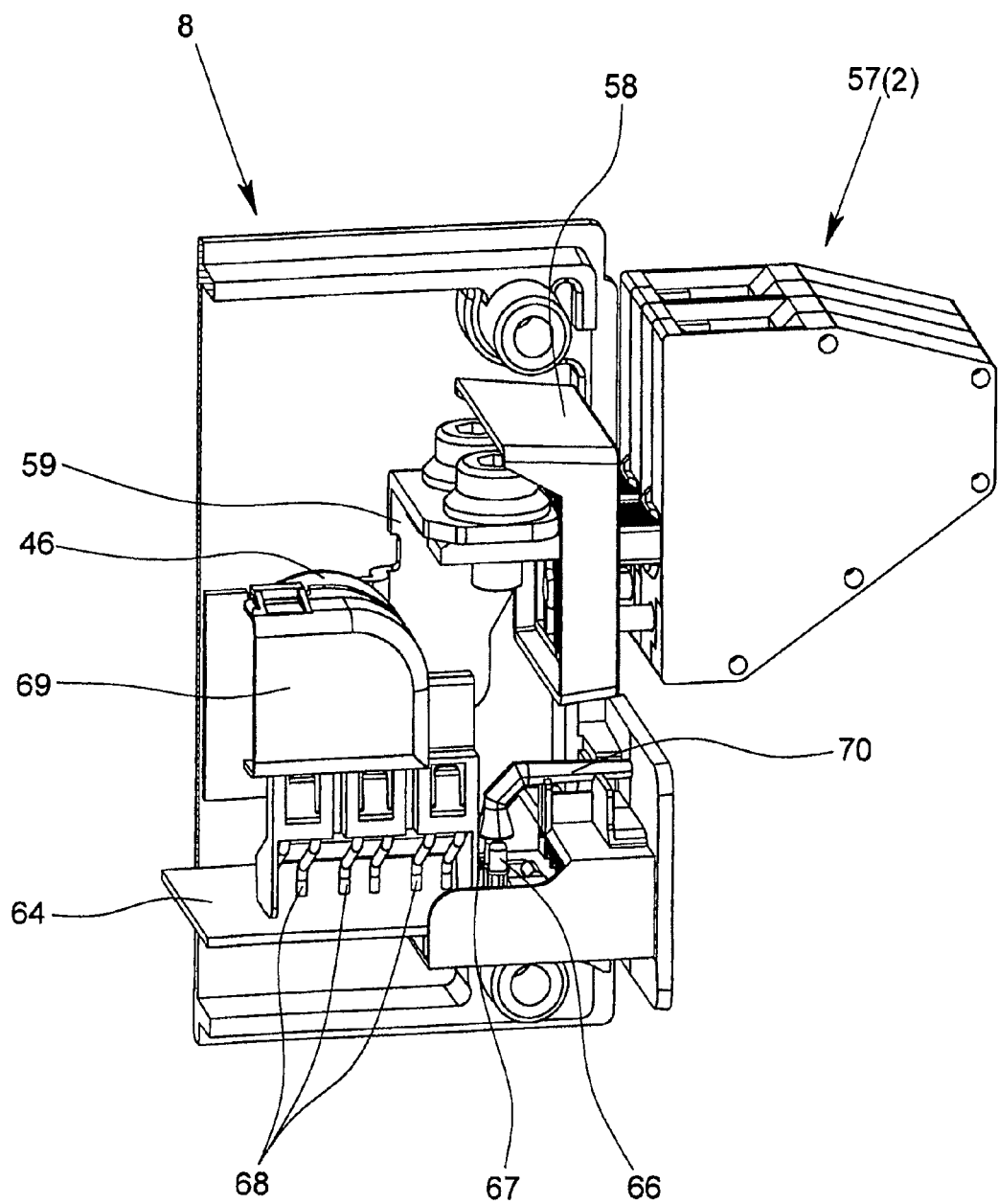
FIG. 7 shows a section of one part of the overvoltage protection element according to FIG. 1.

FIG. 7 shows one exemplary embodiment of display device for display of the state of the varistors 4, 5 which enables both an optical display device on the housing and also a long-distance transmitting state display. The display device has a circuit board 64, which is connected to a base strip of a plug 65, which is routed out of the housing. The local optical display device is operated with auxiliary energy via the plug 65. On the circuit board 64 there are a green LED 66, which lights in the normal state, and a red LED 67, which does not light in the normal state. Moreover there are several temperature fuses 68 which are connected on the one hand to the circuit board 64 and on the other via the temperature fuse holder 69 which is attached to the middle electrode 6 and are in good thermal contact with the middle electrode 6.

If the temperature of the middle electrode 6 reaches a first given boundary temperature, the first temperature fuse 68 triggers, which leads to the green LED 66 that displays the sound state being extinguished. At the same time, the red LED 67 starts to light, as a result of which a fault case is displayed. The light of the LEDs 66, 67 is routed via a light conductor 70 to a display window in the top of the housing half 7. A second temperature fuse 68 can be interrogated via the plug 65 as a long-distance transmitting function display. Via the third temperature fuse 68 which is matched in its trigger temperature to the switching of the short-circuit switch, reaching the switching temperature of the short-circuit switch can be interrogated.

What is claimed is:

1. An overvoltage protection element comprising:
    a housing;
    terminals electrical connecting the overvoltage protection element to a current path or a signal path to be protected;
    two varistors electrically connected in parallel and located within the housing;
    a middle electrode located between the varistors,
    wherein:
        the housing comprises two metal housing halves electrically connected to one another;
        the middle electrode is electrically insulated from the housing halves;
        each of opposite sides the middle electrode is electrically connected to a respective first connecting region of each of the two varistors,
        the two varistors and the middle electrode are sandwiched between the housing halves,
        at least one temperature-dependent short-circuit switch is arranged within the housing, the short-circuit switch or switches being configured to short-circuit at least one of the two varistors when a given boundary temperature is reached due to an excess heating of the at least the two varistors;

the housing halves are each electrically connected to a second connecting region of the two varistors;

the short circuit switch includes a shorting jumper, an insulating retaining element, which is mechanically connected to the shorting jumper, at least one spring element, and a retaining metal;

in a first state:
  the shorting jumper is spaced apart from the middle electrode against the spring force of the spring element;
  the retaining element is supported by a spacer element;
  the spacer element projects through an opening in the middle electrode on the retaining metal; and
  the retaining metal is connected to the middle electrode via a solder connection;

in a second state:
  the solder connection is broken due to heating of the varistors;
  the retaining element and the shorting jumper is at a second position after being moved by the spring force of the spring element, whereat the shorting jumper contacts both the middle electrode and the housing, and the two varistors are short-circuited via the shorting jumper.

2. The overvoltage protection element recited in claim 1, wherein the shorting jumper includes:
  one U-back;
  two U-legs; and
  in the second state, ends of the two U-leg adjoin corresponding contact sections of the second of the housing halves.

3. The overvoltage protection element recited in claim 2, wherein the second of the housing halves includes two contact ribs located adjacent to the contact sections, wherein:
  the ends of the two U-legs each have one bent-back end section, and
  in the second state, each of the bent-back end sections of the U-legs adjoin one of the two contact ribs, and an opposite region of the U-legs adjoins an opposite one of the contact sections.

4. An overvoltage protection element comprising:
  a housing;
  terminals electrical connecting the overvoltage protection element to a current path or a signal path to be protected;
  two varistors electrically connected in parallel and located within the housing;
  a middle electrode located between the varistors, wherein:
    the housing comprises two metal housing halves electrically connected to one another;
    the middle electrode is electrically insulated from the housing halves;
    each opposite sides of the middle electrode is electrically connected to a respective first connecting region of each of the two varistors,
    the two varistors and the middle electrode are sandwiched between the housing halves,
    a temperature-dependent short-circuit switch is arranged within the housing, the short-circuit switch being configured to short-circuit at least one of the two varistors when a given boundary temperature is reached due to an excess heating of the at least the two varistors,
    the middle electrode is connected to a first terminal and is configured to connect to at least one active conductor of the current path or the signal path;
    one connecting metal at a time is arranged between the housing halves and facing second connecting regions of the two varistors;
    the connecting metals each are insulated from the housing halves by an insulating element;
    one short-circuit switch at a time is assigned to the two varistors, each short-circuit switch having a flexible conductor section, an actuating pin, and a spring element, wherein the first end of each flexible conductor section is electrically connected to a contact section of the connecting metals and the second end of each flexible conductor section is connected to an end of the actuating pin;
    in a first state, the second end of each flexible conductor section is spaced apart from a contact section of the middle electrode against the spring force of the spring element, wherein the actuating pin is held in a first position by a thermosensitive element, and
    in a second state, after the thermosensitive element softens due to heating of the varistors, a second end of each flexible conductor section is moved by the spring force of the spring element acting on the actuating pin into a second position at which the second end of a flexible conductor section makes contact with the contact section of the middle electrode and the respective varistor is short circuited via a flexible conductor section.

5. The overvoltage protection element recited in claim 4, wherein:
  each actuating pin is in a hole in a corresponding contact section of the connecting metal;
  each spring element is located between the end of the corresponding actuating pin and the corresponding contact section of the connecting metal;
  each actuating pin includes a thermosensitive pin in a recess;
  the thermosensitive pin in the first state is located on a side of the contact section of the connecting metal opposite the spring element; and
  the thermosensitive pin in the second state is configured to lose its strength when heated and releases the actuating pin from the first position under the spring force of the spring element.

6. The overvoltage protection element recited in claim 4, wherein:
  one back-up fuse at a time is assigned to the two varistors, and
  the connecting metals have one second contact section at a time which is electrically connected to the first terminal of each back-up fuse.

7. The overvoltage protection element recited in claim 1, wherein the housing includes an inner housing surrounding the two varistors and the temperature-dependent short-circuit switch or switches, wherein the inner housing comprising:
  a first housing part connected to the first housing half;
  a second housing part connected to the second housing half; and
  a sealing element.

8. The overvoltage protection element recited in claim 4, wherein the housing includes an inner housing surrounding the two varistors and the temperature-dependent short-circuit switch or switches, wherein the inner housing comprising:
  a first housing part connected to the first housing half;
  a second housing part connected to the second housing half; and
  a sealing element.

* * * * *

UNITED STATES PATENT AND TRADEMARK OFFICE
CERTIFICATE OF CORRECTION

PATENT NO. : 8,766,762 B2  
APPLICATION NO. : 13/642697  
DATED : July 1, 2014  
INVENTOR(S) : Depping et al.

Page 1 of 1

It is certified that error appears in the above-identified patent and that said Letters Patent is hereby corrected as shown below:

On the title page, item [75], the Second Inventor's Last Name should read: -- Christian Stohlmeyer --.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,766,762 B2  
APPLICATION NO. : 13/642697  
DATED : July 1, 2014  
INVENTOR(S) : Depping et al.

Page 1 of 1

It is certified that error appears in the above-identified patent and that said Letters Patent is hereby corrected as shown below:

On the title page item [75], should read
Christian Depping, Lemgo (DE); Christina Stohlmeyer, Detmold (DE);
Joachim Wesgien, Loehne (DE); Philip Jungermann, Blomberg (DE)

Signed and Sealed this
First Day of December, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,766,762 B2 |
| APPLICATION NO. | : 13/642697 |
| DATED | : July 1, 2014 |
| INVENTOR(S) | : Depping et al. |

It is certified that error appears in the above-identified patent and that said Letters Patent is hereby corrected as shown below:

On the title page item [75], should read
        Christian Depping, Lemgo (DE); Christina Stohlmeyer, Detmold (DE);
        Joachim Wosgien, Loehne (DE); Philip Jungermann, Blomberg (DE)

This certificate supersedes the Certificate of Correction issued December 1, 2015.

Signed and Sealed this
Nineteenth Day of January, 2016

Michelle K. Lee
*Director of the United States Patent and Trademark Office*